US012791969B2

(12) United States Patent
Hayashi et al.

(10) Patent No.: US 12,791,969 B2
(45) Date of Patent: Nov. 10, 2026

(54) IMAGE FORMING APPARATUS, METHOD FOR PROCESSING INFORMATION RELATING TO RECORDING MEDIUM, AND NON-TRANSITORY RECORDING MEDIUM

(71) Applicant: Konica Minolta, Inc., Tokyo (JP)

(72) Inventors: Kenichi Hayashi, Anjo (JP); Noriyuki Jinbo, Hamamatsu (JP); Akinori Kimata, Toyokawa (JP); Takahiro Tsujimoto, Toyokawa (JP); Shiro Umeda, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 148 days.

(21) Appl. No.: 18/423,912

(22) Filed: Jan. 26, 2024

(65) Prior Publication Data

US 2024/0255879 A1 Aug. 1, 2024

(30) Foreign Application Priority Data

Jan. 26, 2023 (JP) ................................ 2023-010210

(51) Int. Cl.
*G03G 15/00* (2006.01)

(52) U.S. Cl.
CPC ..... *G03G 15/5029* (2013.01); *G03G 15/5016* (2013.01); *G03G 15/5075* (2013.01);
(Continued)

(58) Field of Classification Search
None
See application file for complete search history.

(56) References Cited

U.S. PATENT DOCUMENTS

2004/0151525 A1* 8/2004 Noda .................... B41J 11/003 399/389
2007/0025745 A1* 2/2007 Aoki ................. G03G 15/5029 399/16

(Continued)

FOREIGN PATENT DOCUMENTS

JP H10-152245 A 6/1998
JP 2003-154735 A 5/2003

(Continued)

OTHER PUBLICATIONS

European Patent Application No. 24152360.4; Extended Search Report; dated May 2, 2024; 8 pages.

(Continued)

*Primary Examiner* — Leslie J Thompson
(74) *Attorney, Agent, or Firm* — BakerHostetler

(57) ABSTRACT

An image forming apparatus includes a conveyance section that conveys a first recording medium and a second recording medium, a sensor that detects information relating to the first recording medium and information relating to the second recording medium, and a hardware processor that causes the sensor to detect the information relating to the first recording medium conveyed first by the conveyance section and to detect the information relating to the second recording medium conveyed by the conveyance section after the first recording medium, and outputs the detected information relating to the second recording medium after the first recording medium.

20 Claims, 12 Drawing Sheets

(52) U.S. Cl.
CPC ..... *G03G 15/6502* (2013.01); *G03G 15/6558* (2013.01); *G03G 15/6588* (2013.01); *G03G 2215/00514* (2013.01)

(56) References Cited

U.S. PATENT DOCUMENTS

| | | | | |
|---|---|---|---|---|
| 2016/0154357 | A1* | 6/2016 | Naruse | H04N 1/00986 358/1.5 |
| 2018/0275590 | A1* | 9/2018 | Nemoto | G03G 15/6564 |
| 2019/0196381 | A1* | 6/2019 | Igo | G03G 15/553 |
| 2021/0364973 | A1 | 11/2021 | Kimura et al. | |
| 2022/0179347 | A1 | 6/2022 | Maruyama et al. | |
| 2022/0253012 | A1 | 8/2022 | Omoto | |

FOREIGN PATENT DOCUMENTS

| | | | |
|---|---|---|---|
| JP | 2005-315856 | A | 11/2005 |
| JP | 2006-333214 | A | 12/2006 |
| JP | 2017-170859 | A | 9/2017 |
| JP | 2018-106112 | | 7/2018 |
| JP | 2019-200397 | A | 11/2019 |
| JP | 2021-100882 | A | 7/2021 |
| JP | 2021-117391 | A | 8/2021 |
| JP | 2021-183521 | A | 12/2021 |
| JP | 2022-001522 | A | 1/2022 |
| JP | 2022-015536 | A | 1/2022 |
| JP | 2022-089505 | | 6/2022 |

OTHER PUBLICATIONS

Japan Patent Application No. 2023-010210; Notice of Reasons for Refusal; dated Apr. 28, 2026; 17 pages.

* cited by examiner

FIG. 8

| DETECTION MEANS | OPTICAL SENSOR | ULTRASONIC SENSOR | DISPLACEMENT SENSOR | SHEET REGULATING PLATE POSITION SENSOR | CMOS SENSOR | ELECTROSTATIC SENSOR | CURRENT DETECTION |
|---|---|---|---|---|---|---|---|
| SHEET INFORMATION | SHEET TYPE | SHEET TYPE | STIFFNESS | SIZE | GRAIN DIRECTION | MOISTURE | RESISTANCE |
| | TRANSMITTANCE | | THICKNESS | | COLOR | BASIS WEIGHT | |
| | REFLECTANCE | | | | SMOOTHNESS | | |
| | BASIS WEIGHT | | | | PULP MATERIAL | | |
| | COATING AGENT | | | | | | |
| | FLUORESCENT AGENT | | | | | | |
| | FILLER | | | | | | |
| | COLOR INFORMATION | | | | | | |
| | PULP MATERIAL | | | | | | |

FIG. 9

TRAY SHEET INFORMATION WINDOW

| TRAY | SIZE | DIRECTION | USER DESIGNATION | AUTOMATICALLY DETECTED AND DETERMINED TYPE | LAST SHEET TYPE IN JOB | NUMBER OF CONTINUOUS SHEETS OF SAME SHEET | HISTORY | NUMBER OF TIMES OF ADDING SHEET AMONG PAST 10,000 SHEETS | REAL-TIME DISPLAY DURING PRINTING |
|---|---|---|---|---|---|---|---|---|---|
| TRAY 1 | A4 | LONGITUDINAL | AUTOMATIC | PLAIN PAPER | PLAIN PAPER | 2500 | CONFIRMATION BUTTON | 2 TIMES | PLAIN PAPER TO PLAIN PAPER |
| TRAY 2 | A3 | LONGITUDINAL | AUTOMATIC | PLAIN PAPER | THIN SHEET | 30 | CONFIRMATION BUTTON | 5 TIMES | STANDBY |
| TRAY 3 | A4 | LATERAL | PLAIN PAPER | UNDETERMINED | THICK SHEET 1 | 200 | CONFIRMATION BUTTON | 0 TIMES | STANDBY |
| TRAY 4 | A4 | LATERAL | AUTOMATIC | THIN SHEET | THIN SHEET | 300 | CONFIRMATION BUTTON | 20 TIMES | STANDBY |
| LCT | A4 | LATERAL | AUTOMATIC | PLAIN PAPER | PLAIN PAPER | 500 | CONFIRMATION BUTTON | 0 TIMES | STANDBY |
| MANUAL | A4 | LONGITUDINAL | AUTOMATIC | PLAIN PAPER | ENVELOPE | 5 | CONFIRMATION BUTTON | 10 TIMES | STANDBY |

FIG. 10

| HISTORY DISPLAY WINDOW FOR TRAY 4 | | | |
|---|---|---|---|
| NEW | PLAIN PAPER | 242 | CHANGE AFTER OPENING AND CLOSING OF TRAY |
| ↑ | THICK SHEET 1 | 20 | CHANGE DUE TO ADDITION |
| ↑ | PLAIN PAPER | 10 | CHANGE AFTER OPENING AND CLOSING OF TRAY |
| ↑ | THICK SHEET 1 | 200 | CHANGE DUE TO ADDITION |
| ↑ | PLAIN PAPER | 500 | CHANGE AFTER TURNING ON |
| ↑ | ⋮ | ⋮ | |
| OLD | PLAIN PAPER | 300 | CHANGE AFTER OPENING AND CLOSING OF TRAY |

FIG. 11

FREQUENCY AT WHICH DIFFERENT TYPES OF SHEETS OF TRAY 4 ARE MIXED IS HIGH.
IT IS RECOMMENDED TO INSERT A SHEET AFTER REMOVING A REMAINING SHEET FOR CHANGING TO A DIFFERENT TYPE OF SHEET IN ORDER TO SECURE STABLE PRINT QUALITY AND FINISH.

FIG. 12

IT IS INFORMED THAT THE SHEET TYPE IS CHANGED ON THE 11TH AND 50TH SHEETS OF YOUR PRINT JOB.

PLAIN PAPER TO THICK SHEET 1

IMAGE FORMING APPARATUS, METHOD FOR PROCESSING INFORMATION RELATING TO RECORDING MEDIUM, AND NON-TRANSITORY RECORDING MEDIUM

CROSS-REFERENCE TO RELATED APPLICATION

This application claims priority to Japanese Patent Application No. 2023-010210 filed on Jan. 26, 2023, the entire disclosure of which is incorporated herein by reference.

BACKGROUND

1. Technological Field

The present invention relates to an image forming apparatus such as a copier, a printer, or a digital multifunction apparatus called a multifunction peripheral (MFP), a method for processing information relating to a recording medium, and a non-transitory recording medium.

2. Description of the Related Art

In general, a user who uses an image forming apparatus wants to select an output sheet by checking what kind of sheet is contained in a sheet feed tray. However, it takes time and effort to go to the apparatus to open and close the sheet feed tray for checking. Meanwhile, by setting sheet information of a sheet in the sheet feed tray, it is possible to check the sheet information without going to the apparatus.

However, in an office environment or the like in which a plurality of users uses the image forming apparatus, a user may randomly add different types of sheets to the sheet feed tray. When the addition is performed, the sheet information of the sheet feed tray is no longer up to date. In addition, since the latest sheet information is not reported, the user cannot grasp the latest status. Further, since a sheet history of the sheet feed tray is unknown, it is difficult to determine whether the sheet feed tray is available.

Meanwhile, a medium detection sensor is used as means for detecting the type of sheet. Patent Literature 1 (Japanese Unexamined Patent Application Publication No. 2022-89505) discloses that a medium detection sensor mounted in an image forming apparatus identifies a physical property of a sheet and displays a type and a basis weight of the sheet.

Patent Literature 2 (Japanese Unexamined Patent Application Publication No. 2018-106112) discloses the following image forming apparatus. This image forming apparatus detects characteristics (medium characteristics) of a recording material conveyed to an image forming section. The image forming apparatus interrupts image forming processing when a detected first medium characteristic of a recording material being conveyed is different from a second medium characteristic of the recording material at the time of previous image formation stored in a RAM, and an image forming condition corresponding to the first medium characteristic is different from an image forming condition corresponding to the second medium characteristic. The image forming apparatus allows a user to input a medium characteristic by an input means after the interruption, and resumes the image forming operation under an image forming condition corresponding to the input medium characteristic.

However, Patent Literatures 1 and 2 do not refer to notifying a user of the latest information relating to a sheet in a sheet feed tray. Therefore, in each of the image forming apparatuses described in Patent Literatures 1 and 2, a user cannot know the latest sheet information in a case where a sheet is added to a sheet feed tray. Patent Literatures 1 and 2 cannot provide a solution to the problem that it is difficult to determine whether the tray is available since the sheet history of the tray is unclear.

SUMMARY

An object of the present invention is to provide an image forming apparatus, a method for processing information relating to a recording medium, and a non-transitory recording medium that can detect and output the latest information relating to a recording medium in a sheet feed tray.

A first aspect of the present invention relates to an image forming apparatus including:

- a conveyance section that conveys a first recording medium and a second recording medium;
- a sensor that detects information relating to the first recording medium and information relating to the second recording medium; and
- a hardware processor that causes the sensor to detect the information relating to the first recording medium conveyed first by the conveyance section and to detect the information relating to the second recording medium conveyed by the conveyance section after the first recording medium, and outputs the detected information relating to the second recording medium after the first recording medium.

A second aspect of the present invention relates to a method for processing information relating to a recording medium, the method including:

- causing a conveyance section to convey a first recording medium and a second recording medium;
- causing a sensor to detect information relating to the first recording medium conveyed first and to detect information relating to the second recording medium conveyed after the first recording medium; and
- outputting the detected information relating to the second recording medium after the first recording medium.

A third aspect of the present invention relates to a non-transitory recording medium storing a program for causing a computer of an image forming apparatus to execute processing of:

- causing a conveyance section to convey a first recording medium and a second recording medium;
- causing a sensor to detect information relating to the first recording medium conveyed first and to detect information relating to the second recording medium conveyed after the first recording medium; and
- outputting the detected information relating to the second recording medium after the first recording medium.

BRIEF DESCRIPTION OF THE DRAWINGS

The advantages and features provided by one or more embodiments of the present invention will become more fully understood from the detailed description given hereinbelow and the appended drawings which are given by way of illustration only, and thus are not intended as a definition of the limits of the present invention.

FIG. 8 is a table in which information relating to a recording medium detectable by each recording medium detector is summarized;

FIG. 9 is a diagram illustrating an example of a display window in a case where results of detecting information relating to recording media in the first detection mode and the second detection mode are displayed;

FIG. 10 is a diagram illustrating a tray history display window displayed when a confirmation button displayed in a "history" item is pressed in the display window illustrated in FIG. 9;

FIG. 11 is a diagram illustrating a warning display screen displayed in a case where the type of sheet held in a holder is changed many times due to addition of a sheet;

FIG. 12 is a diagram illustrating an example of a hop-up display notifying that the type of sheet has been changed in the middle of a print job;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
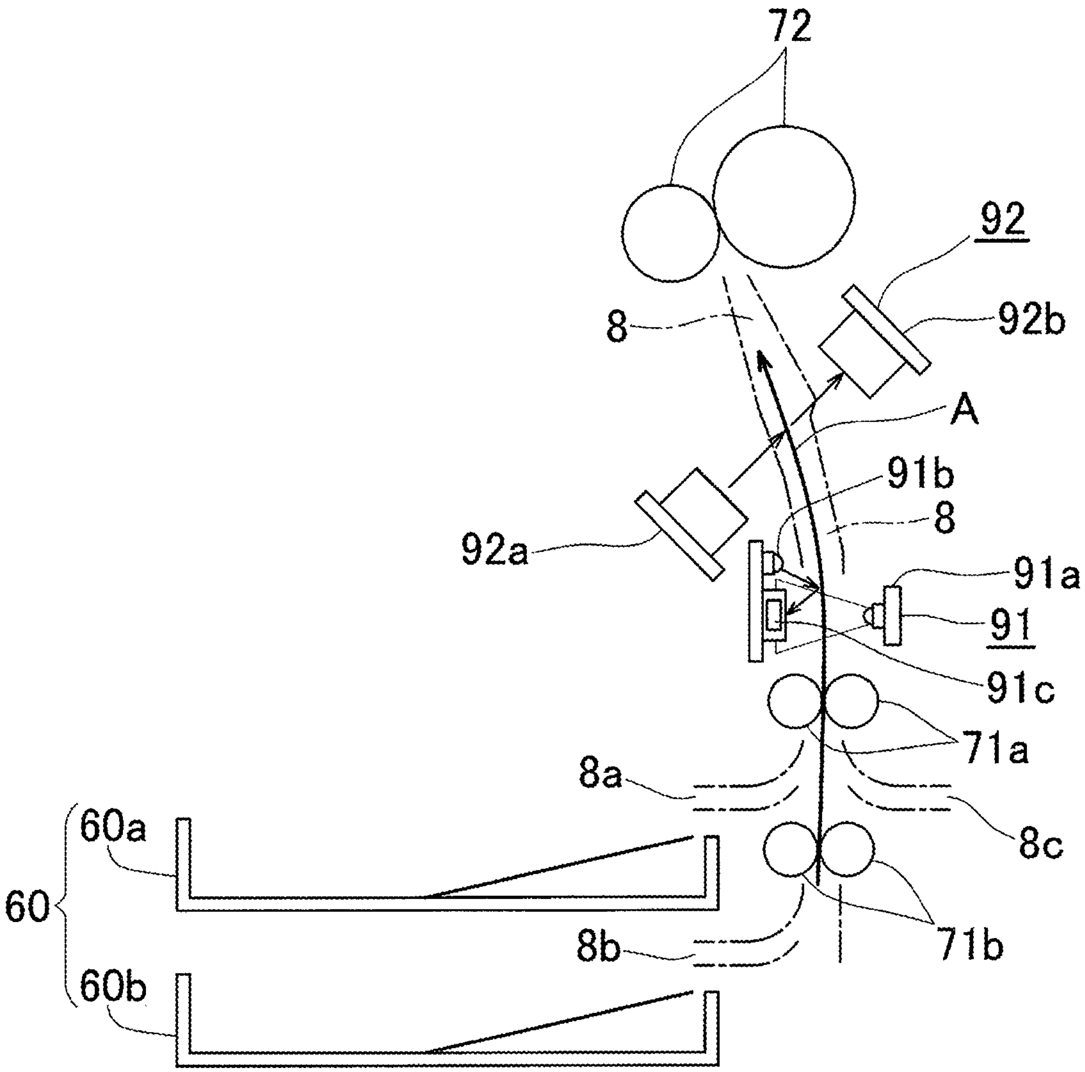
FIG. 1 is a diagram schematically illustrating a part of a conveyance path for a sheet on which an image is printed in an image forming apparatus.

FIG. 1 is a diagram schematically illustrating a part of a conveyance path for a recording medium (hereinafter, the recording medium is also referred to as a sheet or paper) on which an image is printed in an image forming apparatus 1 according to an embodiment of the present invention.

Examples of the image forming apparatus 1 include, but are not limited to, a copier, a printer, and an MFP which is a digital multifunction apparatus.

In FIG. 1, a sheet feed section 60 is provided at a lower portion of the image forming apparatus 1. In the sheet feed section 60, a first sheet feed tray 60*a* which is a first-stage sheet feed cassette in an upper stage and a second sheet feed tray 60*b* which is a second-stage sheet feed cassette in a lower stage are arranged. A sheet conveyance path 8 is formed in a vertical direction so as to communicate with a sheet feed port 8*a* of the first sheet feed tray 60*a* and a sheet feed port 8*b* of the second sheet feed tray 60*b*. A sheet fed from the sheet feed port 8*a* of the first sheet feed tray 60*a* or the sheet feed port 8*b* of the second sheet feed tray 60*b* to the sheet conveyance path 8 is conveyed upward in the sheet conveyance path 8 as indicated by an arrow A. The sheet is conveyed to a pair of skew correction rollers 72 installed at the position of an upper portion of the sheet conveyance path 8 by conveyance rollers (corresponding to a sheet conveyance section) 71*a* and 71*b*, and the like.

Further, a manual sheet feed tray (not illustrated) is provided on the opposite side of the first sheet feed tray 60*a* with the sheet conveyance path 8 interposed therebetween. A sheet set on the manual sheet feed tray is supplied to the sheet conveyance path 8 via a manual sheet feed port 8*c*.

Each of the first sheet feed tray 60*a*, the second sheet feed tray 60*b*, and the manual sheet feed tray corresponds to a holder that holds a sheet. A user can open and close the first sheet feed tray 60*a*, the second sheet feed tray 60*b*, and the manual sheet feed tray with respect to the image forming apparatus 1. Opening the first sheet feed tray 60*a* and the second sheet feed tray 60*b* means removing the first sheet feed tray (sheet feed cassette) 60*a* and the second sheet feed tray (sheet feed cassette) 60*b* from a main body of the apparatus for the purpose of replacement of a sheet, addition of a sheet, or the like. Opening the manual sheet feed tray means that a sheet is removed from the manual sheet feed tray to bring the manual sheet feed tray into a non-use state.

On the other hand, closing the first sheet feed tray 60*a* and the second sheet feed tray 60*b* means attaching the first sheet feed tray 60*a* and the second sheet feed tray 60*b* to the main body of the apparatus. Closing the manual sheet feed tray means setting a sheet on the manual sheet feed tray and bringing the manual sheet feed tray into a use state.

Further, opening the first sheet feed tray 60*a*, the second sheet feed tray 60*b*, and the manual sheet feed tray is also referred to as opening the sheet feed ports 8*a*, 8*b*, and 8*c*. Closing the first sheet feed tray 60*a*, the second sheet feed tray 60*b*, and the manual sheet feed tray is also referred to as closing the sheet feed ports 8*a*, 8*b*, and 8*c*. The opening and closing of the first sheet feed tray 60*a* and the second sheet feed tray 60*b* can be detected by a sensor (not illustrated). The opening and closing of the manual sheet feed tray can be detected based on whether a sheet is present on the manual sheet feed tray.

The skew correction rollers 72 are rollers for correcting skew (inclination) of a sheet conveyed in the sheet conveyance path 8.

Between the sheet feed port 8*a* of the first sheet feed tray 60*a* in the upper stage and the skew correction rollers 72, two medium detection sensors 91 and 92 are arranged on the upstream side and the downstream side in a conveyance direction in the sheet conveyance path 8. The medium detection sensors 91 and 92 detect a physical property value of a sheet that is an example of information relating to the sheet. The medium detection sensor 91 on the upstream side is an optical sensor that detects light emitted to the sheet. The medium detection sensor 92 on the downstream side is an ultrasonic sensor that detects an ultrasonic wave output toward the sheet. The optical sensor 91 may be disposed on the upstream side, and the ultrasonic sensor 92 may be disposed on the downstream side.

Figure 2:
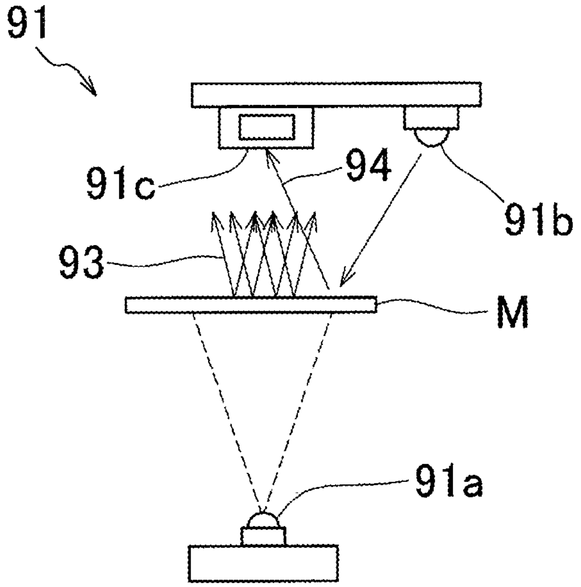
FIG. 2 is an explanatory diagram illustrating an optical sensor.

FIG. 2 is an explanatory diagram illustrating the optical sensor 91. The optical sensor 91 includes a transmission light source 91*a* such as an LED, a reflection light source 91*b* such as an LED, and a light receiving element 91*c* such as a photodiode. The amount of transmitted light 93, which is light emitted from the transmission light source 91*a* and transmitted through a sheet M conveyed in the sheet conveyance path 8, and the amount of reflected light 94, which is light emitted from the reflection light source 91*b* and reflected by the sheet M, are detected as physical property values by the light receiving element 91*c*. Then, based on the detected levels of the amount of the transmitted light and the amount of the reflected light, a controller 100 described later determines the type of the sheet M (a basis weight, an OHP sheet, a recycled sheet, a coated sheet, or the like). Based on this determination, the controller 100 detects the type of sheet (sheet type) that is another example of the information relating to the sheet. The optical sensor 91 may include a plurality of sensor groups corresponding to red, green, and blue colors, for example.

Figure 3:
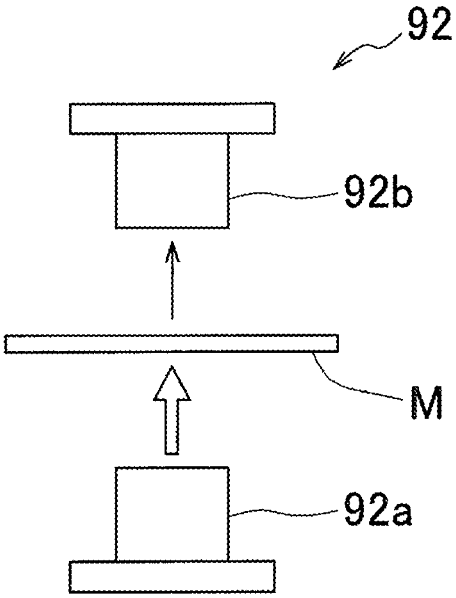
FIG. 3 is an explanatory diagram illustrating an ultrasonic sensor.

FIG. 3 is an explanatory diagram illustrating the ultrasonic sensor 92. The ultrasonic sensor 92 includes a pair of an ultrasonic transmitter 92*a* and an ultrasonic receiver 92*b* which are obliquely opposed to each other with the sheet conveyance path 8 interposed therebetween with respect to a direction in which the sheet M passes (see FIG. 1). The ultrasonic sensor 92 transmits an ultrasonic wave from the ultrasonic transmitter 92*a* to the passing sheet M, and receives the ultrasonic wave transmitted through the sheet M by the ultrasonic receiver 92*b*. Then, the controller 100, which will be described later, detects the type of the sheet M as information relating to the sheet by determining whether the sheet M is a single sheet or a two-ply sheet (envelope) based on the amount of attenuation of the ultrasonic wave by the sheet M.

In the present embodiment, the image forming apparatus 1 has a user designation mode and an automatic detection mode, and a user can select one of the modes. The user designation mode is a mode in which the user designates a sheet type. When the user designation mode is selected, the detection of a physical property value of a sheet and the determination of the sheet type by the medium detection sensors 91 and 92 are not performed. When the automatic detection mode is selected, the detection and the determination of the sheet type by the medium detection sensors 91 and 92 are performed.

Figure 4:
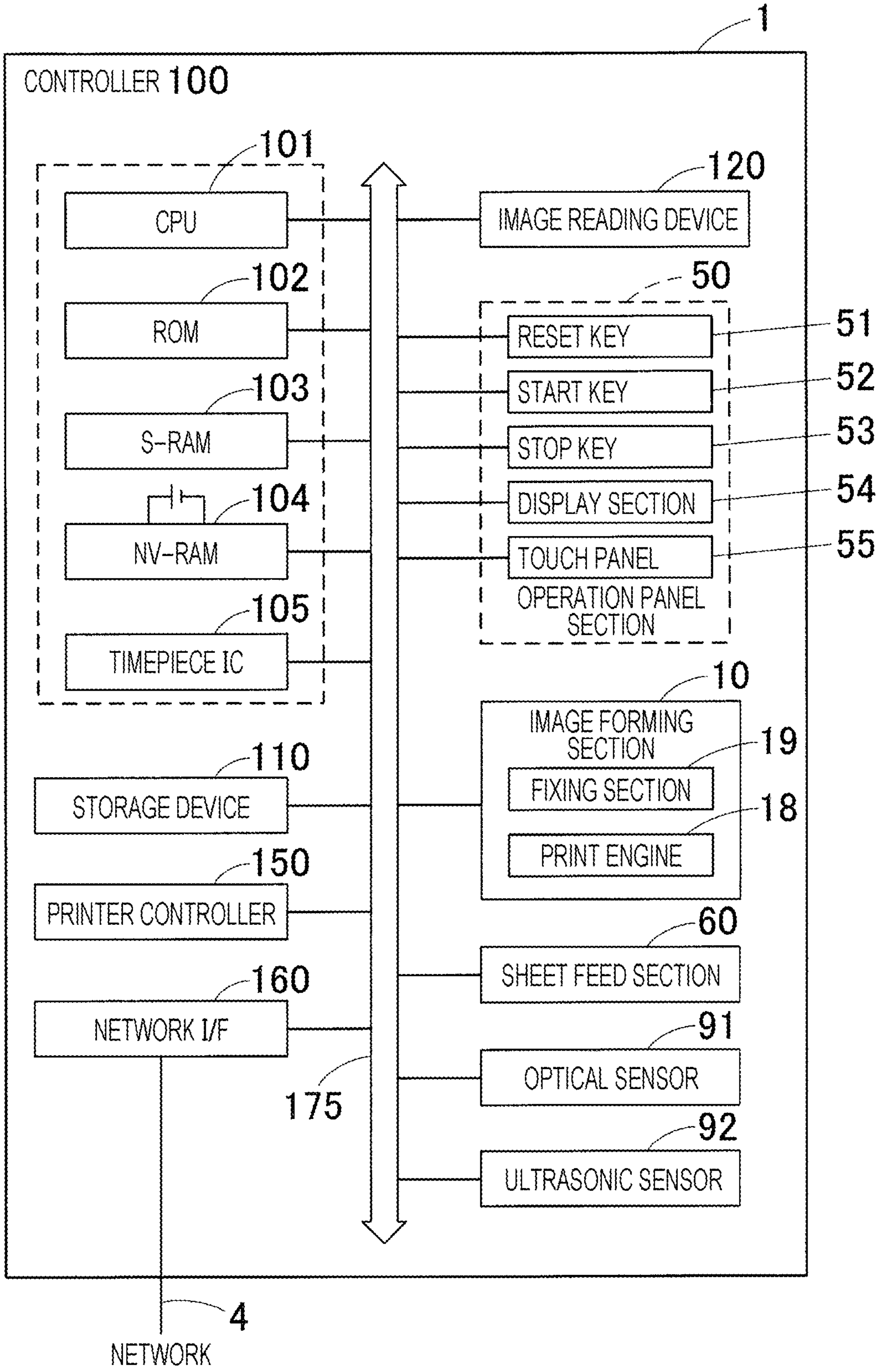
FIG. 4 is a block diagram illustrating an electrical configuration of the image forming apparatus.

FIG. 4 is a block diagram illustrating an electrical configuration of the image forming apparatus 1. As illustrated in FIG. 4, the image forming apparatus 1 includes the controller 100, a storage device 110, an image reading device 120, an operation panel section 50, an image forming section 10, the sheet feed section 60, the optical sensor 91, and the ultrasonic sensor 92 described above. The image forming apparatus 1 further includes a printer controller 150 and a network interface (network I/F) 160. These components are connected to each other via a system bus 175.

The controller 100 includes a central processing unit (CPU) 101, a read only memory (ROM) 102, a static random access memory (S-RAM) 103, a nonvolatile RAM (NV-RAM) 104, and a timepiece IC 105.

The CPU 101 comprehensively controls the entire image forming apparatus 1 by executing an operation program stored in the ROM 102 or the like. For example, the CPU 101 controls a copy function, a printer function, a scan function, and the like such that the copy function, the printer function, the scan function, and the like are executable. In particular, in this embodiment, the CPU 101 executes detection of physical property values of a sheet based on detection of an amount of light by the optical sensor 91 and detection of an ultrasonic wave by the ultrasonic sensor 92. The CPU 101 determines the sheet type based on the results of the detection, automatically sets an image forming condition corresponding to the sheet type based on the determination result at the time of printing, and executes printing. The CPU 101 stores and accumulates the physical property values of the sheet detected by the optical sensor 91 and the ultrasonic sensor 92, the determination result of the sheet type, and the like in the storage device 110. The CPU 101 further executes control processing such as output to the operation panel section 50 or an external apparatus.

The ROM 102 stores programs to be executed by the CPU 101 and other information.

The S-RAM 103 serves as a work area for the CPU 101 to execute a program, and temporarily stores the program, data for executing the program, and the like.

The NV-RAM 104 is a nonvolatile memory backed up by a battery. The NV-RAM 104 stores various settings relating to image formation, the number of pixels of a display section 54, data of various screens to be displayed on the display section 54, and the like.

The timepiece IC 105 measures time, functions as an internal timer, and measures a processing time.

The storage device 110 includes a hard disk or the like, and stores programs, various types of data, and the like. In particular, in this embodiment, the storage device 110 accumulates the results of detecting the sheet physical property values by the optical sensor 91 and the ultrasonic sensor 92, the determination result of the sheet type, a detection history, and the like.

The image reading device 120 includes a scanner or the like, reads a document set on a platen glass by scanning the document, and converts the read document into image data.

The operation panel section 50 is used for a user to provide an instruction such as a job to the image forming apparatus 1 and set various settings. The operation panel section 50 includes a reset key 51, a start key 52, a stop key 53, the display section 54, and a touch panel 55.

The reset key 51 is used to reset a setting, the start key 52 is used for a start operation such as scanning, and the stop key 53 is pressed to interrupt the operation.

The display section 54 includes, for example, a liquid crystal display device, and outputs and displays messages, various operation screens, and the like. The touch panel 55 is formed on a screen of the display section 54, and detects a user's touch operation.

The image forming section 10 prints, on a sheet, a copy image generated from image data of a document read by the image reading device 120 or from print data transmitted from an external terminal apparatus 3 or the like. The image forming section 10 includes a print engine 18 and a fixing section 19 that fixes an image by heating and pressing a sheet on which the image is formed. The print engine 18 includes hardware components for image formation, such as a photosensitive drum, a charging device, an exposure device, a developing device, a transfer belt, and a transfer roller.

The network I/F 160 functions as communication means that transmits and receives data to and from the external apparatus via a network 4. Examples of the external apparatus include an external server, a cloud system, a printer driver of an information terminal apparatus of a user, and other image forming apparatuses.

Figure 5:
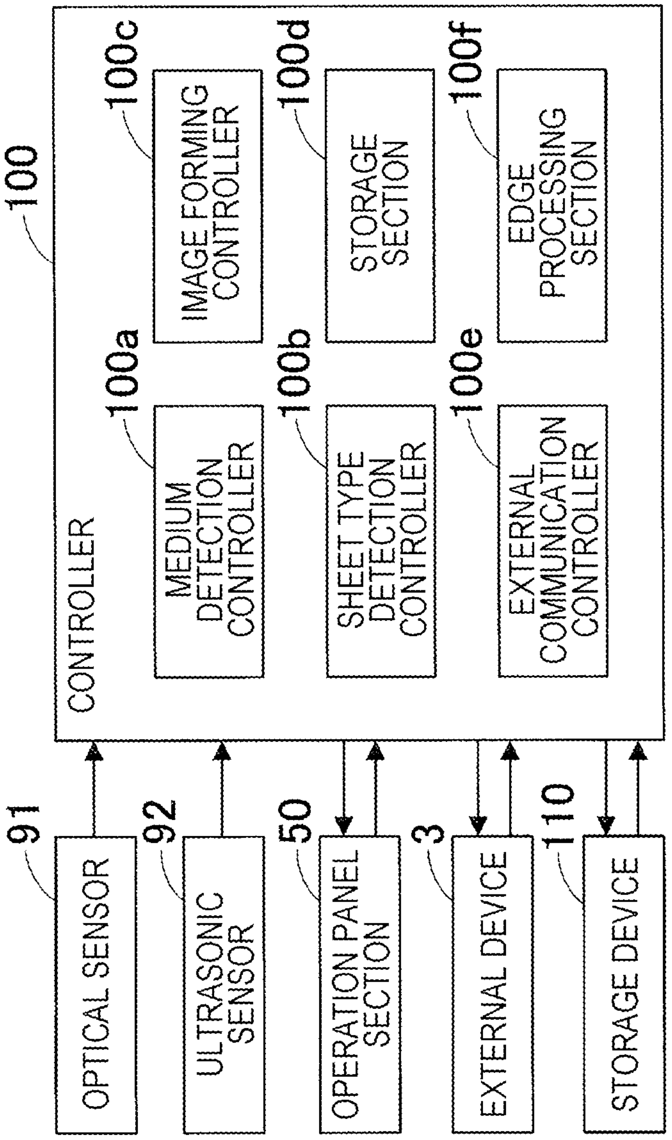
FIG. 5 is a block diagram illustrating a functional configuration of a controller of the image forming apparatus.

FIG. 5 is a block diagram illustrating a functional configuration of the controller 100. The controller 100 functionally includes a medium detection controller 100*a*, a sheet type detection controller 100*b*, an image forming controller 100*c*, a storage section 100*d*, an external communication controller 100*e*, and an edge processing section 100*f*.

The medium detection controller 100*a* causes the optical sensor 91 and the ultrasonic sensor 92, which are medium detection sensors, to operate in a first detection mode and a second detection mode, which will be described later, to detect physical properties and the like of a sheet. The sheet type detection controller 100*b* detects the sheet type based on the results of the detection by the optical sensor 91 and the ultrasonic sensor 92.

The image forming controller 100*c* controls the image forming section 10 under an image forming condition corresponding to each sheet type based on the sheet type detected by the sheet type detection controller 100*b*, and prints an image on the sheet.

The storage section 100*d* temporarily stores the results of detecting the physical property values of the sheet by the optical sensor 91 and the ultrasonic sensor 92, the result of detecting the sheet type by the sheet type detection controller 100*b*, the detection history, and the like. The information stored in the storage section 100*d* is transferred to the storage device 110 illustrated in FIG. 4, and is accumulated and updated.

The external communication controller 100*e* corresponds to the network I/F 160 illustrated in FIG. 4. The external communication controller 100*e* transmits and receives data to and from the external apparatus 3 including a terminal apparatus, an external server, another image forming apparatus, or the like.

The edge processing section 100*f* has an analyzing function and a learning function, and analyzes a factor of a change in a sheet type and the like using information accumulated in the storage device 110.

Next, the operation of the image forming apparatus 1 will be described focusing on control by the controller 100.

In this embodiment, in each of the first detection mode and the second detection mode, the controller 100 causes the optical sensor 91 and the ultrasonic sensor 92 to detect a physical property value and a sheet type of a sheet conveyed in the sheet conveyance path 8.

The first detection mode is executed on the first sheet conveyed first. For the first sheet to be conveyed first, the first sheet feed tray 60*a* or the second sheet feed tray 60*b* is opened (removed) to perform replacement, supplement, addition, or the like of a sheet. The first sheet is a sheet to be conveyed first after the first sheet feed tray 60*a* or the second sheet feed tray 60*b* is closed (inserted). Alternatively, in the case of the manual sheet feed tray, the first sheet to be conveyed first is a sheet to be conveyed first after the result of detection as to whether a sheet is present indicates that a sheet is present after a state in which no sheet is present, that is, after the manual sheet feed tray is closed. Alternatively, the first sheet to be conveyed first is a sheet to be conveyed first from a sheet feed port having no sheet type information after sheet type information is reset by turning off and on the image forming apparatus 1, recovering from sleep, or the like. Alternatively, the first sheet to be conveyed first is a sheet to be conveyed first from a sheet feed port when a medium detection function is switched from OFF to ON. Alternatively, the first sheet to be conveyed first is a sheet to be conveyed first in a print job.

The information relating to the first sheet is undetermined. In the first detection mode, the conveyance is performed at a low speed such that detection results can be reflected in a process condition (image forming condition). Further, in order to perform detailed detection, it is preferable to increase the number of times of reading by the sensors within a sheet surface to improve the accuracy. As a result, the type of the sheet in the sheet feed tray is determined. A fixing temperature and a transfer current are determined under the process condition (image forming condition) corresponding to the determined sheet type. From the next sheet, printing is preferably executed after an appropriate condition for the conveyance speed is selected.

On the other hand, the second detection mode is a mode in which a physical property value and a sheet type of a sheet other than the first sheet are detected after the sheet type of the first sheet is determined in the first detection mode and before the first sheet feed tray 60*a*, the second sheet feed tray 60*b*, or the manual sheet feed tray is opened. The detection in the second detection mode may be performed on all sheets except for the first sheet. The detection in the second detection mode may be performed on each plurality of sheets, for example, every other sheet or every fifth sheet, or may be performed at the beginning and end of a job except for the first sheet.

In the second detection mode, the conveyance speed corresponds to the sheet type determined by the detection in the first detection mode. Therefore, depending on the sheet type, the conveyance speed is higher than that in the first detection mode. This shortens a time period from when the sheet reaches the medium detection sensors 91 and 92 to when the sheet reaches the skew correction rollers 72. Accordingly, a detection period in the second detection mode is shorter than a detection period in the first detection mode.

Figure 6:
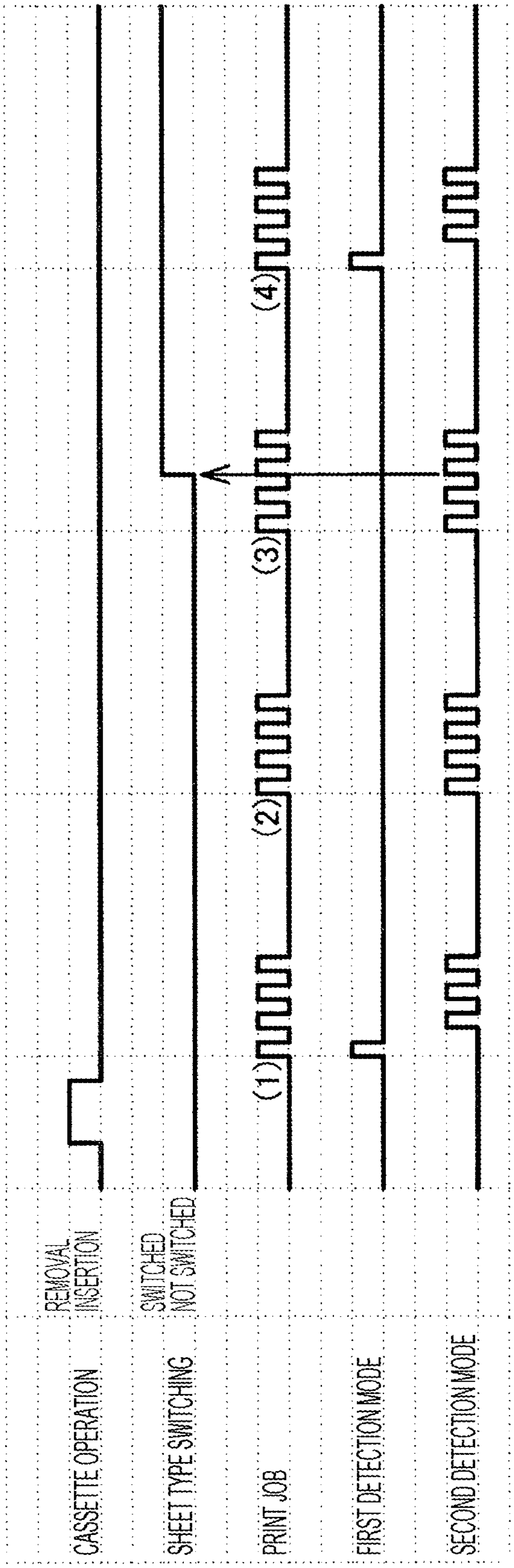
FIG. 6 is a diagram illustrating an example of a sequence in a first detection mode for detecting information relating to a first recording medium conveyed first and a second detection mode for detecting information relating to a recording medium after the first recording medium.
Figure 7:
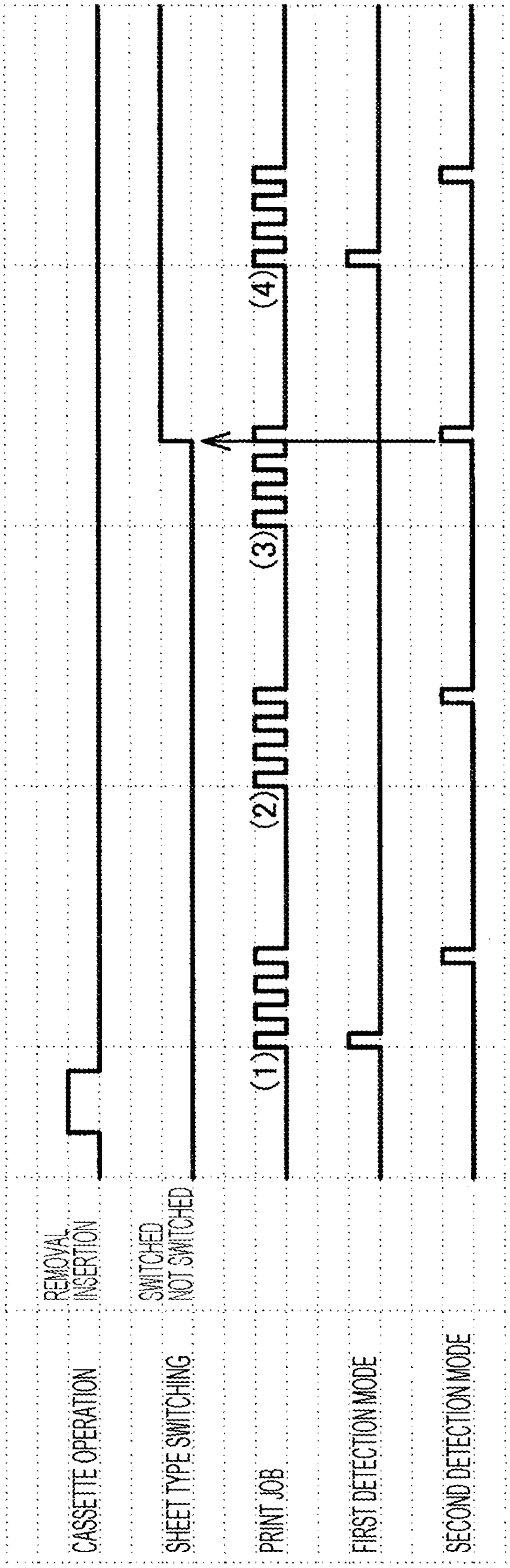
FIG. 7 is a diagram illustrating another example of the sequence in the first detection mode and the second detection mode.

FIGS. 6 and 7 illustrate different sequence examples for the first detection mode and the second detection mode. In FIGS. 6 and 7, for example, the first sheet feed tray 60*a* is removed and inserted (opened and closed) as indicated by a "cassette operation" signal. Thereafter, four print jobs (1) to (4) each indicating four sheets are executed as indicated by a "print job" signal.

In both FIGS. 6 and 7, in the first detection mode, the detection is performed on the first sheet fed and conveyed from the first sheet feed tray 60*a* after the first sheet feed tray 60*a* is removed and inserted (opened and closed), in other words, the first sheet in the print job (1).

On the other hand, in the second detection mode, the detection is performed on all the sheets except for the first sheet in FIG. 6. In FIG. 7, the detection is performed on the last sheet in each job. FIG. 6 illustrates that the switching of the sheet type is detected by the detection of the third sheet (the eleventh sheet stacked after the opening and closing of the sheet feed cassette) in the print job (3), and FIG. 7 illustrates that the switching of the sheet type is detected by the detection of the last sheet in the print job (3). By such detection, the image forming apparatus 1 can detect that different types of sheets have been added in the same sheet feed cassette.

In the examples illustrated in FIGS. 6 and 7, the detection is also performed on the first sheet in the first job (print job (4)) after the detection of the switching of the sheet type in the first detection mode.

The image forming apparatus 1 is configured to be able to perform the detection described with reference to FIGS. 6 and 7 as the second detection mode, and the image forming apparatus 1 may select either one of the detection operations according to the performance of the image forming apparatus 1 and the type of sheet to be conveyed. For example, in a case where the processing performance of the image forming apparatus 1 is low and the conveyance speed of sheets is high, there is a possibility that various kinds of control during printing may not be performed in time for the detection of each sheet. Therefore, the image forming apparatus 1 may detect a physical property value and a sheet type of only the last sheet in a job as illustrated in FIG. 7. The image forming apparatus 1 may detect not only the last sheet in the job but also every predetermined number of sheets such as every two sheets or every three sheets in the job.

In the present embodiment, information relating to a sheet detected by the medium detection sensors 91 and 92 is a physical property value or a sheet type of the sheet. The physical property value may include at least one of transmittance information, reflectance information, stiffness information, thickness information, basis weight information, size information, grain direction information, color information, moisture information, smoothness information, resistance information, friction information, and configuration information of the sheet. The configuration information of the sheet includes information of at least one of a pulp material, a coating agent, a fluorescent agent, or a filler.

Table 1 illustrated in FIG. 8 summarizes these pieces of information for each detection means. For example, from the optical sensor 91, information of a sheet type, transmittance, reflectance, a basis weight, a coating agent, a fluorescent agent, a filler, color information, and a pulp material determined from the optical characteristics of a sheet is obtained. Information of the sheet type is obtained from the ultrasonic sensor 92. Further, by measuring displacement amounts of the sheet conveyance rollers by a displacement sensor, information of the stiffness of the sheet and the thickness of the sheet can be obtained. Information of the sheet size is obtained from a sheet regulating plate position sensor of each of the sheet feed cassettes 90*a* and 90*b*. From a sensor using a CMOS, information of the grain direction, color, smoothness, and pulp material of the sheet is obtained. Information of the moisture and the basis weight is obtained from an electrostatic sensor, and information relating to the resistance is obtained by detecting a transfer current.

As for a sheet type, the image forming apparatus 1 can determine that a physical property value of a detection target is different by providing a threshold value for the physical property value, for example, transmittance, and can thus detect types of sheets ranging from a thin sheet to a thick sheet. Further, the sheets include a sheet made of at least one of a pulp material, a resin material, a textile material, an envelope made of at least one of a pulp material, a resin material, a textile material, and/or an overhead projector (OHP) sheet.

The controller 100 of the image forming apparatus 1 has a function of controlling execution of each of the first detection mode and the second detection mode, and outputting a detection result. Examples of an output destination of the detection result include the display section 54 of the operation panel section 50 of the image forming apparatus 1, a status display device including an LED and the like, a printer driver of a user's information terminal connected to a network, and a server or cloud system connected to a network.

A display window as illustrated in FIG. 9 is displayed on a display section of each output destination, for example, the display section 54 of the operation panel section 50. Also, in a case where the detection result is output to the printer driver of the user's information terminal, the server or cloud connected to the network, and the like, a similar display window is displayed on display sections of the information terminal, the server or cloud, and the like. The display of the display window may be performed when a user operates an output button displayed on the display section 54 of the operation panel section 50. The display of the display window may be periodically performed at predetermined timings. The outputting of the information to the printer driver of the user's information terminal, the server, and the cloud may be performed by a spontaneous output operation from the image forming apparatus 1, or may be performed in a format in which output requests from the printer driver, the server, and the cloud are received and downloaded. The server and the cloud may collect information from the image forming apparatus 1 or another image forming apparatus as an information collecting service.

As illustrated in FIG. 9, the following items are displayed in the display window for each tray, that is, each of the sheet feed cassettes 60*a* and 60*b* and the manual sheet feed tray. That is, the items are displayed, which are "sheet size", "direction", "user designation", "automatically detected and determined type", "last sheet type in a job", "the number of continuous sheets of the same sheet", "history", "the number of times of adding a sheet among past 10,000 sheets", and "real-time display during printing".

In FIG. 9, as the trays, trays 1 to 4, a large-capacity tray (LCT), and a manual sheet feed tray are exemplified.

"Sheet size" and "direction" respectively indicate a sheet size and a sheet setting direction. "User designation" indicates which one of the user designation mode and the automatic detection mode has been selected. When the user designation mode is selected, a sheet type designated by a user is displayed.

In "automatically detected and determined type", information of a sheet type determined after closing of a cassette or for the first sheet by the detection in the first detection mode is displayed. In a case where the user designation mode is selected, since the automatic detection by the medium detection sensors 91 and 92 is not performed and the sheet type is not determined, "undetermined" is displayed in the "automatically detected and determined type" item.

In "last sheet type in job", type information of the last sheet in the job at the current time point when continuous printing is performed is displayed. The number of continuous sheets of the same sheet is displayed in "number of continuous sheets of the same sheet". Confirmation buttons are displayed in "history". When a confirmation button is pressed, a history of a tray corresponding to the pressed confirmation button is displayed. This feature will be described later.

The number of times that it has been determined that a sheet has been added among past 10,000 sheets is displayed in "the number of times of adding a sheet among past 10,000 sheets".

In "real-time display during printing", the detected latest sheet type and a sheet type detected immediately before are displayed for the tray during printing. In the example illustrated in FIG. 9, it is displayed that printing is being performed on a sheet of the tray 1, and both the latest sheet type and the immediately preceding sheet type are plain paper.

FIG. 10 illustrates a tray history display window displayed when the confirmation button for, for example, the tray 4 displayed in the "history" item in the display window illustrated in FIG. 9 is pressed.

The tray history display window indicates details of histories of results of detection by the medium detection sensors 91 and 92 for sheets held on the tray 4. The user can view changes in the sheet type for a predetermined number of sheets on the tray 4 in the past. More specifically, the tray history display window indicates that the sheet type changes in the order of plain paper, thick sheet 1, plain paper, thick sheet 1, and plain paper, and indicates the number of printed sheets for each sheet type. The causes of the changes in the sheet type are analyzed by the edge processing section 100*f* of the image forming apparatus 1, and results of the analysis are displayed.

For example, when the tray 4 is opened and closed, it is determined that the user has replaced a sheet, and the change after the opening and closing of the tray is displayed. When the image forming apparatus 1 is turned off and on and the user replaces a sheet during the turning off, the change after the turning on is displayed. When the sheet type is changed even though no tray is opened and closed or the image forming apparatus 1 is not turned off and on, it is determined that different types of sheets are mixed, and the change due to the addition of a sheet is displayed. When the number of changes due to the addition of sheets is large, a message describing a disadvantage of adding sheets a large number of times is output as illustrated in FIG. 11. An output destination of the message is the display section 54 of the operation panel section 50, the printer driver of the user's information terminal, the server or cloud connected to the network, and the like, and a warning is displayed on the display section 54 and display sections of the information terminal, the server or cloud, and the like. In the example illustrated in FIG. 11, it is displayed that the frequency of mixing of different types of sheets in the tray 4 is high, and that it is desirable to insert sheets after removing a remaining sheet for changing to a different type of sheet in order to secure stable print quality and finish.

FIG. 12 illustrates an example of a pop-up display for informing that the sheet type is changed in the middle of a print job. In this example, it is displayed that the sheet type is changed from plain paper to thick sheet 1 on the 11th and/or 50th sheets in the print job. The pop-up display illustrated in FIG. 12 is also output to the display section 54 of the operation panel section 50, the display device for the printer driver of the user's information terminal, the server or cloud connected to the network, and the like, and is displayed on each display section.

The display is not limited to the pop-up display, and may be a display (state notification display) for notifying the user that the sheet type has been changed by blinking of an indicator such as an LED. Further, even when a print job of the user is not being executed, display for notifying, for example, a user waiting to print in order that a sheet type has been changed during a print job of another user may be performed.

As described above, by providing notification that a sheet type has been switched during the execution of a print job, the user can grasp the latest sheet type information and history information in the trays, and can appropriately select a tray to be used. Further, in a case where the user does not want to use the results of the automatic detection by the medium detection sensors 91 and 92, the user can customize the setting appropriately and safely. For example, in a case where the latest sheet type is thick sheet 1, a sheet is normally conveyed at a conveyance speed corresponding to thick sheet 1, but a user who wants to output quickly may change the setting to plain paper and perform printing. In this case, as in the conventional case, if the sheet type is not the latest and information of a wrong sheet type before switching is output although the sheet type has been switched, the setting may be useless or the setting for plain paper may be inappropriate. For example, when thick sheet 1 is displayed although the latest sheet type held in the tray is plain paper, a change in the setting to the setting for plain paper by the user is useless. On the other hand, in a case where information of a sheet type which is wrong as thick sheet 1 is output although the latest sheet type in the tray is thick sheet 4, when the setting for plain paper is set, the setting may cause a jam or a failure. Also from such a point of view, since the user can recognize the latest sheet type information and history information, it is possible to properly and safely perform customization.

Figure 13:
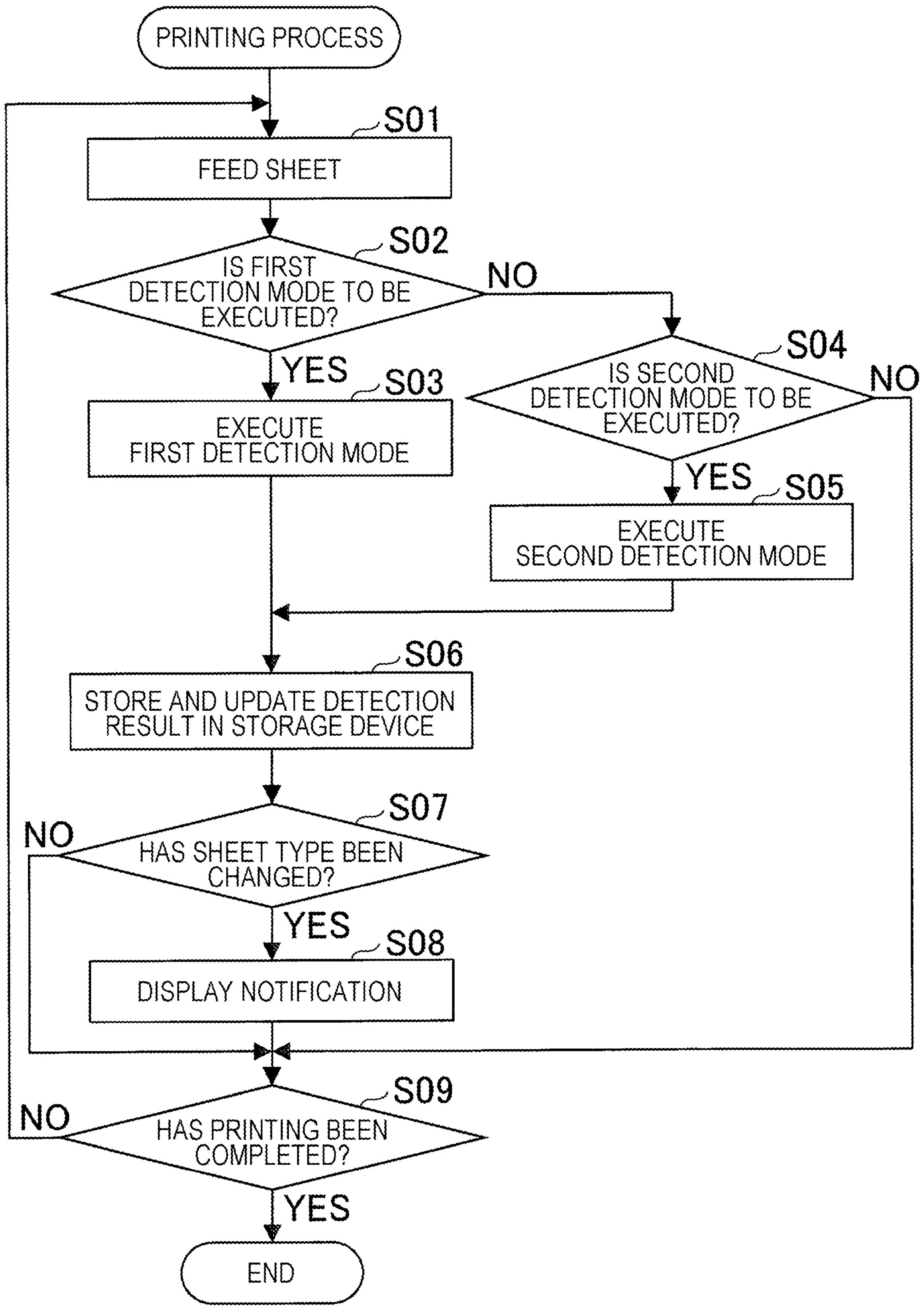
FIG. 13 is a flowchart illustrating a printing process performed by the image forming apparatus.

FIG. 13 is a flowchart illustrating a printing process performed by the image forming apparatus 1. This printing process is executed by the CPU 101 of the controller 100 of the image forming apparatus 1 operating in accordance with an operation program stored in a storage section such as the ROM 102.

In step S01, the feeding of the first sheet is started. In step S02, it is determined whether it is time to execute the first detection mode. When it is time to execute the first detection mode (YES in step S02), the medium detection is executed in the first detection mode in step S03, and then the process proceeds to step S06. When it is not time to execute the first detection mode (NO in step S02), it is determined in step S04 whether it is time to execute the second detection mode. When it is time to execute the second detection mode (YES in step S04), the medium detection is executed in the second detection mode in step S05, and then the process proceeds to step S06. When it is not time to execute the second detection mode (NO in step S04), the process proceeds to step S09.

In step S06, a detection result in the first detection mode or the second detection mode is stored and updated in the storage device 110.

Next, in step S07, it is checked whether a sheet type has been changed. When the sheet type has been changed (YES in step S07), a notification as illustrated in FIG. 12, which notifies the user that the sheet type has been changed, is displayed in the display section 54 of the operation panel section 50 in step S08. Thereafter, the process proceeds to step S09. In a case where the display to be notified to the user is displayed on the external apparatus such as the information terminal of the user, the server, the cloud, or the like, display data is output via the network. Also, in a case where the sheet type has not been changed in step S07 (NO in step S07), the process proceeds to step S09.

In step S09, it is determined whether printing has been completed. When the printing has not been completed (NO in step S09), the process returns to step S01 in order to print the next page. When the printing has been completed (YES in step S09), the process is ended.

Figure 14:
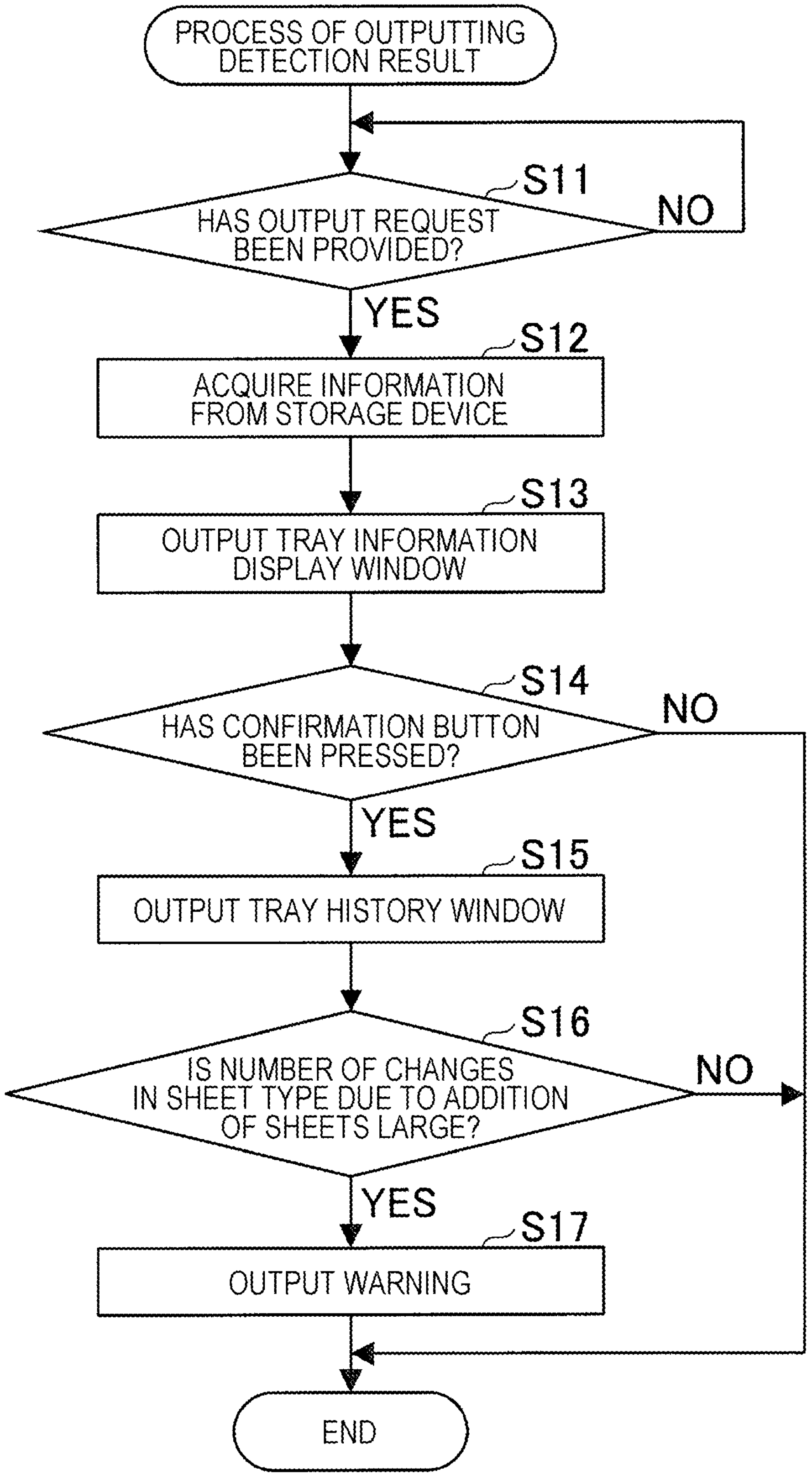
FIG. 14 is a flowchart illustrating a process of outputting a result of detection by the image forming apparatus.

FIG. 14 is a flowchart illustrating a process of outputting a result of medium detection. This output process is also executed by the CPU 101 of the controller 100 of the image forming apparatus 1 operating in accordance with an operation program stored in a storage section such as the ROM 102.

In step S11, it is determined whether an output request has been provided. In the case of output (display) to the operation panel section 50, the output request is provided by operating a predetermined operation button displayed on the display section 54 of the operation panel section 50. Alternatively, a request from the external apparatus such as the server or the cloud may be received.

When no output request is not provided (NO in step S11), the process waits for an output request. When the output request is provided (YES in step S11), information of a detection result accumulated in the storage device 110 is acquired in step S12. Thereafter, in step S13, a tray information display window as illustrated in FIG. 9 is created and output. In a case where the tray information display window is output to the display section 54 of the operation panel section 50, the tray information display window is displayed on the display section 54.

Next, in step S14, it is determined whether a confirmation button displayed in the "history" item in the tray information display window illustrated in FIG. 9 has been pressed. When the button has not been pressed (NO in step S14), the process is ended. When the button has been pressed (YES in step S14), a tray history window for the corresponding tray as illustrated in FIG. 10 is outputted (displayed) in step S15.

Thereafter, in step S16, it is determined whether the number of changes in the sheet type due to the addition of a sheet is large. For example, a threshold value may be set in advance, and it may be determined that the number is large when the number is equal to or larger than the threshold value.

When the number of changes in the sheet type due to the addition of a sheet is large (YES in step S16), a warning is output (displayed) in step S17, and then the process is ended. When the number of changes in the sheet type due to the addition of a sheet is not large (NO in step S16), the process is ended without the warning being output (displayed).

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

a conveyance section that conveys a first recording medium and a second recording medium;

a sensor that detects first information relating to the first recording medium and second information relating to the second recording medium; and a hardware processor that:

causes the sensor to detect the first information relating to the first recording medium conveyed first by the conveyance section at a first speed and determines a first recording medium type based on the first information relating to the first recording medium received from the sensor, causes the sensor to detect the second information relating to the second recording medium conveyed by the conveyance section at a second speed that is higher than the first speed, after the determination of the first recording medium type based on first information relating to the first recording medium and determines a second recording medium type based on the second information relating to the second recording medium received from the sensor, wherein a time period for which the sensor operates to detect the second information relating to the second recording medium after the first recording medium has been conveyed by the conveyance section is shorter than a time period for which the sensor operates to detect the first information relating to the first recording medium; and outputs notification information in response to determining that the second medium type differs from the first medium type.

2. The image forming apparatus according to claim 1, further comprising a holder that is openable and closable with respect to the image forming apparatus and holds the first and second recording media, wherein the hardware processor causes the sensor to detect the first information relating to the first recording medium conveyed first by the conveyance section and to detect the second information relating to the second recording medium conveyed by the conveyance section after the first recording medium after the holder is closed and before the holder is opened and closed next.

3. The image forming apparatus according to claim 1, wherein the first and second information respectively relating to the first and second recording media is a physical property value of the first and second recording media or a type of the first and second recording media determined based on the physical property value, and the physical property value is at least one of transmittance information, reflectance information, stiffness information, thickness information, basis weight information, size information, grain direction information, color information, moisture information, smoothness information, resistance information, friction information, and information of at least any one of a pulp material, a coating agent, a fluorescent agent, and a filler that are components of paper.

4. The image forming apparatus according to claim 1, wherein the first and second recording media include an envelope made of at least one of a pulp material, a resin material, a textile material, and/or an OHP sheet.

5. The image forming apparatus according to claim 1, wherein the first recording medium conveyed first is at least one of a recording medium conveyed first from a sheet feed port after the sheet feed port is closed, a recording medium conveyed first from the sheet feed port when a state in which no recording medium is present is changed to a state in which the recording medium is present, and a recording medium conveyed first from the sheet feed port without information relating to the recording medium.

6. The image forming apparatus according to claim 1, wherein an image forming condition is determined based on the first information relating to the first recording medium conveyed first and detected by the sensor.

7. The image forming apparatus according to claim 1, wherein the sensor determines whether to perform detection of information relating to a recording medium after the first recording medium every time a recording medium is conveyed in accordance with a conveyance speed or every time a predetermined number of recording media are conveyed.

8. The image forming apparatus according to claim 1, wherein the hardware processor also outputs the first information relating to the first recording medium detected by the sensor.

9. The image forming apparatus according to claim 1, wherein the hardware processor outputs the second information relating to the second recording medium after the first recording medium to at least one of a printer driver display section of an information terminal connected to the image forming apparatus, a display section of the image forming apparatus, and an external server connected to the image forming apparatus.

10. The image forming apparatus according to claim 1, wherein the hardware processor analyzes, based on a change in a result of the detection by the sensor, whether a recording medium has been added.

11. The image forming apparatus according to claim 1, wherein an output destination of the notification information is a display section of one or more of an operation panel section, a printer driver of the user's information terminal, a server, or a cloud connected to a network.

12. The image forming apparatus according to claim 1, wherein the notification information is a pop-up display on a display screen or a state notification display using an indicator.

13. The image forming apparatus according to claim 1, further comprising:

a holder that is openable and closable with respect to the image forming apparatus and holds the first and second recording media; and a storage section that stores and updates an opening/closing history of the holder and a history of detection and update of the first and second information respectively relating to the first and second recording media in association with each other.

14. The image forming apparatus according to claim 1, wherein the sensor performs detection of information relating to a recording medium after the first recording medium a plurality of times at intervals in a single job.

15. The image forming apparatus according to claim 1, further comprising a holder that is openable and closable with respect to the image forming apparatus and holds the first and second recording media, wherein the sensor performs detection of information relating to a recording medium after the first recording medium a plurality of times until the holder is opened.

16. The image forming apparatus according to claim 1, wherein the sensor performs detection of information relating to recording media after the first recording medium at least for the second recording medium and a last recording medium in a job.

17. The image forming apparatus according to claim 1, further comprising a storage section that stores the information relating to the first and second recording media detected by the sensor, wherein a request to acquire the first and second information respectively relating to the first and second recording media from the storage section is received from an external server.

18. The image forming apparatus according to claim 1, wherein image forming apparatus includes an image forming section that continues to operate without stopping when the hardware processor determines that information relating to the second recording medium differs from the information relating to the first recording medium.

19. A method for processing information relating to a recording medium, the method comprising:

causing a conveyance section to convey a first recording medium and a second recording medium;

causing a sensor to detect first information relating to the first recording medium conveyed first and to detect second information relating to the second recording medium conveyed after the first recording medium;

determining, buy a hardware processor, a first medium type from the first information relating to the first recording medium and a second medium type from the second information relating to the second recording medium; and outputting notification information when the hardware processor determines the second recording medium type differs from the first recording medium type;

wherein a time period for which the sensor operates to detect the second information relating to the second recording medium after the first recording medium has been conveyed by the conveyance section is shorter than a time period for which the sensor operates to detect the first information relating to the first recording medium.

20. A non-transitory recording medium storing a program for causing a computer of an image forming apparatus to execute processing of:

causing a conveyance section to convey a first recording medium and a second recording medium;

causing a sensor to detect first information relating to the first recording medium conveyed first and to detect second information relating to the second recording medium conveyed after the first recording medium;

determining, by a hardware processor, a first medium type from the first information relating to the first recording medium and a second medium type from the second information relating to the second recording medium; and outputting notification information when the hardware processor determines the second recording medium type differs from the first recording medium type;

wherein a time period for which the sensor operates to detect the second information relating to the second recording medium after the first recording medium has been conveyed by the conveyance section is shorter than a time period for which the sensor operates to detect the first information relating to the first recording medium.

* * * * *